(12) United States Patent
Hofman et al.

(10) Patent No.: US 10,146,756 B2
(45) Date of Patent: Dec. 4, 2018

(54) PERSPECTIVE ANNOTATION FOR NUMERICAL REPRESENTATIONS

(71) Applicant: Microsoft Corporation, Redmond, WA (US)

(72) Inventors: Jake Hofman, New York, NY (US); Miroslav Dudik, New York, NY (US); Daniel Goldstein, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 603 days.

(21) Appl. No.: 13/801,365

(22) Filed: Mar. 13, 2013

(65) Prior Publication Data

US 2014/0281874 A1   Sep. 18, 2014

(51) Int. Cl.
G06F 17/30   (2006.01)
G06F 17/24   (2006.01)

(52) U.S. Cl.
CPC ........ G06F 17/241 (2013.01); G06F 17/3061 (2013.01); G06F 17/30864 (2013.01); G06F 17/30882 (2013.01); G06F 17/30991 (2013.01)

(58) Field of Classification Search
CPC combination set(s) only.
See application file for complete search history.

(56) References Cited

U.S. PATENT DOCUMENTS

| 7,979,425 | B2 | 7/2011 | Garg et al. |
| 2003/0050773 | A1* | 3/2003 | Martinez ........... G06F 17/30554 704/10 |
| 2003/0101204 | A1 | 5/2003 | Watson |
| 2003/0212527 | A1* | 11/2003 | Moore et al. ................. 702/179 |
| 2003/0220795 | A1 | 11/2003 | Arayasantiparb et al. |
| 2009/0150325 | A1* | 6/2009 | De et al. .......................... 706/52 |
| 2009/0265338 | A1* | 10/2009 | Kraft et al. ....................... 707/5 |
| 2010/0223261 | A1 | 9/2010 | Sarkar |
| 2011/0010397 | A1* | 1/2011 | Kathpal ....................... 707/802 |
| 2011/0179026 | A1* | 7/2011 | Mulligen .......... G06F 17/30616 707/728 |

(Continued)

FOREIGN PATENT DOCUMENTS

| EP | 1361523 A2 | 11/2003 |
| WO | 2009/007181 A1 | 1/2009 |

OTHER PUBLICATIONS

"International Search Report & Written Opinion for PCT Patent Application No. PCT/US2014/020450", dated Oct. 16, 2014, 11 Pages.

(Continued)

Primary Examiner — Stephen Hong
Assistant Examiner — Hope C Sheffield
(74) Attorney, Agent, or Firm — Liang IP, PLLC (57) ABSTRACT

Various techniques for providing perspective annotation to numerical representations are disclosed herein. For example, a method includes detecting a numerical representation in an original content and retrieving one or more perspectives from a database based on the detected numerical representation. The one or more perspectives individually include a restatement of information contained in the numerical representation. The method can also include annotating the original content with the retrieved one or more perspectives to form an annotated content.

20 Claims, 5 Drawing Sheets

(56) References Cited

U.S. PATENT DOCUMENTS

2011/0288852 A1* 11/2011 Dymetman ......... G06F 17/2827
                                                              704/4
2013/0226953 A1* 8/2013 Markovich ......... G06F 17/3064
                                                              707/767

OTHER PUBLICATIONS

Segel, et al., "Narrative Visualization: Telling Stories with Data", In IEEE Transactions on Visualization and Computer Graphics, vol. 16, Issue No. 6, Nov. 1, 2010, pp. 1139-1148.
Numberator—Universal Numbers Translator, retrieved from http://webs.sinectis.com.ar/alejand/num/numberator.htm, on Jan. 15, 2013.
Convert Numeric Dollar Values into Text in Excel, retrieved from http://www.teachexcel.com/free-excel-macros/m-127,excel-udf-convert-numbers-text-dollars-macro-free.html, on Jan. 15, 2013.
ACC2000: How to Convert Currency or Numbers into English Words, retrieved from http://support.microsoft.com/kb/210586, on Jan. 15, 2013.
How to Translate Wingdings, retrieved from http://www.ehow.com/how_6802033_translate-wingdings.html, on Jan. 15, 2013.
Translation of Figures in English, retrieved from http://translation.babylon.com/english/figures/, on Jan. 15, 2013.
Converting Numeric Dollar Values to Text in VB.NET, retrieved from http://www.c-sharpcorner.com/UploadFile/scottlysle/converting-numeric-dollar-values-to-text-in-VB-Net/, published Nov. 8, 2012.
Symbolic to Numerical Conversion of DNA Sequences Using Finite-Context Models, Armando J. Pinho, Diogo Pratas, Paulo J. S. G. Ferreira and Sara P. Garcia, 19th European Signal Processing Conference, Aug. 29, 2011, 5 pages.
Online Conversion—Advanced Roman Numeral Converter, retrieved from http://www.onlineconversion.com/roman_numerals_advanced.htm, on Jan. 15, 2013.
Rules and Style Conventions for Expressing Values of Quantities, retrieved from http://physics.nist.gov/Pubs/SP811/sec07.html, on Jan. 15, 2013.
Calais: Connect Everything, retrieved from http://www.opencalais.com/, on Jan. 22, 2013.
Yahoo! News, retrieved from http://news.yahoo.com/, on Jan. 22, 2013.
The New York Times, retrieved from http://www.nytimes.com/, on Jan. 22, 2013.
WolframAlpha, retrieved from http://www.wolframalpha.com/, on Jan. 22, 2013.
Bargeron, et al., "Robustly Anchoring Annotations Using Keywords", Published on: Nov. 16, 2001 Available at: http://research.microsoft.com/apps/pubs/default.aspx?id=69898.
"International Preliminary Report on Patentability Issued in PCT Application No. PCT/US2014/020450", dated Jun. 12, 2015, 9 Pages.

* cited by examiner

PERSPECTIVE ANNOTATION FOR NUMERICAL REPRESENTATIONS

BACKGROUND

Numerical representations in articles, books, or other content may be difficult to understand without context. For example, readers may not appreciate a deficit of $1.1 trillion for the United States government in 2012 because the readers may not relate to such a large number and/or deficit for a government. In contrast, readers may more readily appreciate the story if the deficit figure is expressed as, for example, $3,500 per capita or 7% of gross domestic production of the United States. However, such context may only be available with extensive research efforts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present technology is directed to detecting numerical representations in an original content and generating context or perspectives for the detected numerical representations. The numerical representations can be associated with articles, books, web pages, electronic communications, and/or other suitable original content. For example, the numerical representations may include numbers, with or without units, of monetary data, area, temperature, pressure, and/or other suitable measurements. The numerical representations may be identified by distinguishing from addresses, telephone numbers, dates, serial numbers, and/or other non-arithmetical data. Based on the detected numerical representations, context or perspectives of the numerical representations may be retrieved, suggested, and/or otherwise presented. In certain embodiments, the suggested perspectives may be ranked based on usage, popularity, importance, and/or other suitable criteria. In other embodiments, user selection of suggested perspectives may be recorded to update the ranking of the suggested perspectives.

DETAILED DESCRIPTION

Various embodiments of systems, devices, components, modules, routines, and processes for providing perspective annotation of numerical representations are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-3C.

As used herein, the term "numerical representation" generally refers to any numbers, figures, statistics, and/or other numerical quantities. For example, a numerical representation can be an amount of money, a temperature, a pressure, a flow rate, an area, a length/depth/width, a speed, a duration of time, and/or other suitable numbers with or without associated unit of measurement. Also used herein, the term "perspective" generally refers to a re-expression or restatement of information contained in a numerical representation through unit conversion, data normalization, data rescaling, data conversion, data comparison, and/or other suitable transformation techniques.

As discussed above, numerical representations may be difficult to understand without context. Several embodiments of the present technology are directed to automatically detecting numerical representations in an article, a book, a web page, or other content. Perspectives for the detected numerical representations can then be generated, for example, by retrieving from a database. The content may then be annotated or otherwise associated with the retrieved perspectives to provide context for the detected numerical representations. As a result, consumers of the content may be more interested in the content, and authors may be more aware of the significance of and/or possible errors in the numerical representations than conventional techniques.

Figure 1:
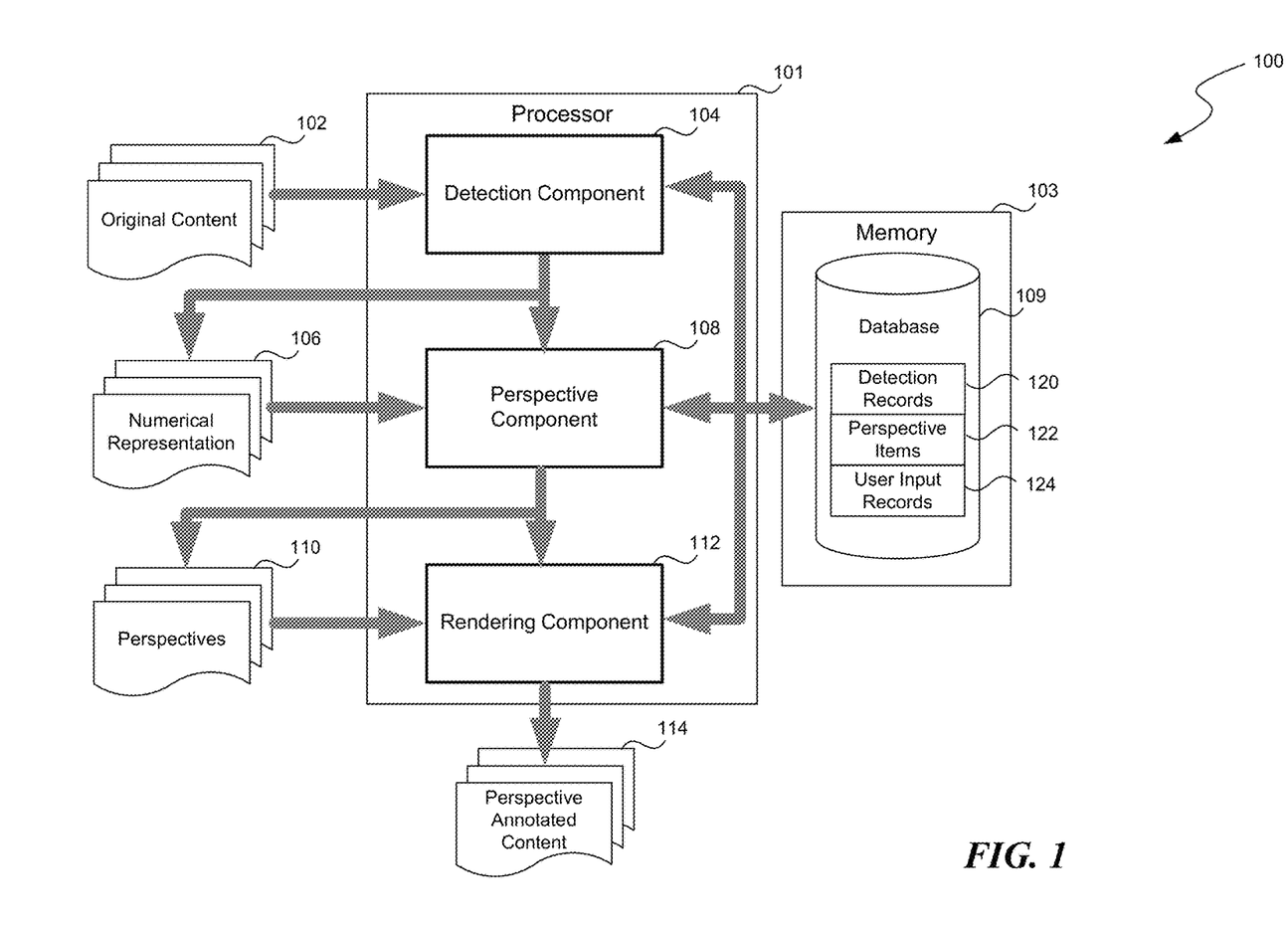
FIG. 1 is a schematic block diagram illustrating a computer system for perspective annotation in accordance with embodiments of the present technology.

FIG. 1 is a schematic block diagram illustrating hardware and software components of a computer framework 100 for perspective annotation in accordance with embodiments of the present technology. In FIG. 1 and in other Figures hereinafter, individual software components, modules, and routines may be a computer program, procedure, or process written as source code in C, C++, Java, Fortran, and/or other suitable programming languages. The computer program, procedure, or process may be compiled into object or machine code and presented for execution by one or more processors of a personal computer, a network server, a laptop computer, a smart phone, and/or other suitable computing devices. Various implementations of the source and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1, the computer framework 100 can include a processor 101 operatively coupled to a memory 103. The processor 101 can include a mainframe processor, a microprocessor, a field-programmable gate array, and/or other suitable logic devices. The memory 103 can include volatile and/or nonvolatile computer readable storage media (e.g., magnetic disk storage media, optical storage media, and flash memory drives) excluding propagating signals. The memory 103 can be configured to store data received from, as well as instructions for, the processor 101. As shown in FIG. 1, the memory 103 can include a database 109 that contains detection records 120, perspective items 122, and user input records 124. In other embodiments, the database 109 may contain other suitable records.

The processor 101 can be configured to execute instructions for software components. For example, as shown in FIG. 1, the software components of the processor 101 can include a detection component 104, a perspective component 108, and a rendering component 112 operatively coupled to one another. In one embodiment, all of the foregoing components can reside on a single network computing device (e.g., a network server). In another embodiment, all of the foregoing components may reside on a single personal computer, laptop computer, and/or other suitable client devices. In other embodiments, at least one of the foregoing components (e.g., the perspective component 108) may reside on a network server while the remaining components reside on one or more client devices to the network server. In further embodiments, the computer framework 100 may also include interface components, input/output components, and/or other suitable components.

The detection component 104 can be configured to detect one or more numerical representations in an original content 102. The original content 102 can include an article, a book, a web page, an electronic message, and/or other suitable content. In one embodiment, the detection component 104 can include rule-based heuristics for detecting numerical representations. The rules can be implemented as comparison routines, finite state machines, and/or other suitable routines stored in the database 109 or other suitable locations as detection records 120. For example, the detection component 104 may include the following rules to distinguish non-numerical representations:

Addresses are not numerical representations;
Telephone numbers are not numerical representations; or
Dates are not numerical representations.

In another example, the detection component 104 may include the following rules to identify numerical representations:

Numerical figures following a dollar sign are numerical representations;
Numerical figures followed by a degree sign are numerical representations;
Numerical figures followed by a unit of measurement are numerical representations; or
Numerical figures with a decimal point are numerical representations.

In further examples, the detection component 104 may include other suitable rules in addition to or in lieu of the foregoing example rules.

In another embodiment, the detection component 104 can also be "trained" to identify numerical representations via machine learning. For example, sample content with previously identified numerical and/or non-numerical representations may be provided to the detection component 104. The detection component 104 may then "learn" to distinguish between the numerical and/or non-numerical representations via supervised learning, unsupervised learning, semi-supervised learning, reinforcement learning, learning to learn, and/or other suitable machine learning techniques. In other examples, the detection component 104 may be trained by monitoring user input, user feedback, and/or by using other suitable training techniques. In yet further embodiments, the detection component 104 may be implemented via natural language processing, compound term processing, deep linguistic processing, semantic indexing, and/or other suitable techniques. The detection component 104 can then transmit the detected one or more numerical representations 106 to the perspective component 108 for further processing.

The perspective component 108 can be configured to associate the detected numerical representation 106 with one or more subject of the original content 102. For example, if the original content 102 includes "The federal deficit fell to $1.1 trillion in the 2012 fiscal year." The numerical representation 106 would include "$1.1 trillion." The perspective component 108 may then analyze the original content (e.g., by examining the sentence structure) to determine that the "$1.1 trillion" is associated with "federal deficit" in 2012. In other examples, the perspective component 108 may analyze and associate the detected numerical representations 106 by examining paragraph structure, title, abstract, and/or other suitable portion of the original content 102.

The perspective component 108 can also be configured to generate one or more perspectives 110 based on the numerical representations 106 with the associated one or more subjects. In one embodiment, the perspective component 108 can search the database 109 for any perspective items 122 associated with the numerical representations 106 using the one or more subject as keywords. In other embodiments, the perspective component 108 may search the database 109 based on numerical values of the numerical representations 106 and/or other suitable criteria.

In certain embodiments, the perspective items 122 may be generated via crowdsourcing. For example, a request for input on a subject (e.g., "federal deficit") may be presented online to a large group of users for soliciting contributions. The received contributions may then be processed and stored as the perspective items 122 in the database 109. In other embodiments, the perspective items 122 may be compiled by a company, a library, or other suitable entity with or without contributions from the public in general. In further embodiments, the perspective items 122 may be machine generated by scanning, analyzing, and categorizing subjects in web pages, databases, and/or other suitable sources. In further embodiments, the perspective items 122 may be generated via at least one of the foregoing techniques and/or other suitable techniques.

In one embodiment, a perspective item 122 may include a unit conversion of the detected numerical representation 106. For example, a "federal deficit" of "$1.1 trillion" may be converted to "833 billion euros." In another embodiment, the perspective item 122 may include a rescaled figure for the detected numerical representation 106. In the foregoing example, a "federal deficit" of "$1.1 trillion" can also be expressed as $3,500 per capita. In another embodiment, the perspective item 122 may also include a comparison with other associated figures. For example, a "federal deficit" of "$1.1 trillion" represents a 20% decrease from 2011 or 7% of gross domestic product of the United States. In yet another embodiment, the perspective item 122 may also include the rank, quantile, or percentile of the detected numerical representation relative to an appropriate reference class. For example, a "federal deficit" of "$1.1 trillion" is the largest national deficit among the developed countries. In further embodiments, the perspective items 122 may also be expressed or stated in other suitable manners.

The perspective component 108 can optionally be configured to rank the retrieved perspective items 122 based on usage, popularity, importance, and/or other suitable criteria. For example, if the expression of the "federal deficit" of "$1.1 trillion" as $3,500 per capita is the most frequently restatement by users, the perspective component 108 may rank the expression higher than other expressions. In other examples, a combination of the foregoing and/or other suitable criteria may be used to rank the perspective items 122. The perspective component 108 then supplies the perspective items 122 ranked or un-ranked to the rendering component 112 as perspectives 110.

The rendering component 112 can be configured to annotate or otherwise associate the original content 102 with the perspectives 110 to generate perspective annotated content 114. The original content 102 may be annotated as comments, footnotes, and/or other suitable items in the original content 102. In certain embodiments, the rendering component 112 can also be configured to display the perspective annotated content 114 as a web page, an electronic book, and/or other suitable types of content on a computer monitor, a touch screen, and/or other suitable computer output devices.

In further embodiments, the rendering component 112 can also be configured to receive user input to the perspective annotated content 114. The received user input may then be stored in the database 109 as user input records 124 for ranking, generating, and/or otherwise processing the perspective items 122. In response to the received user input, in one embodiment, the rendering component 112 may rearrange (e.g., reorder) the perspectives 110 as annotations in the perspective annotated content 114. In another embodiment, the rendering component 112 can also be configured to facilitate inserting a user selected perspective 110 into the original content 102. In further embodiments, the render component 112 may update the displayed perspective annotated content 114 with the inserted perspective 110. Operations of the computer framework 100 are described in more detail below with reference to FIG. 2. Example renderings of a perspective annotated content 114 are described in more detail below with reference to FIGS. 3A-3C.

Figure 2:
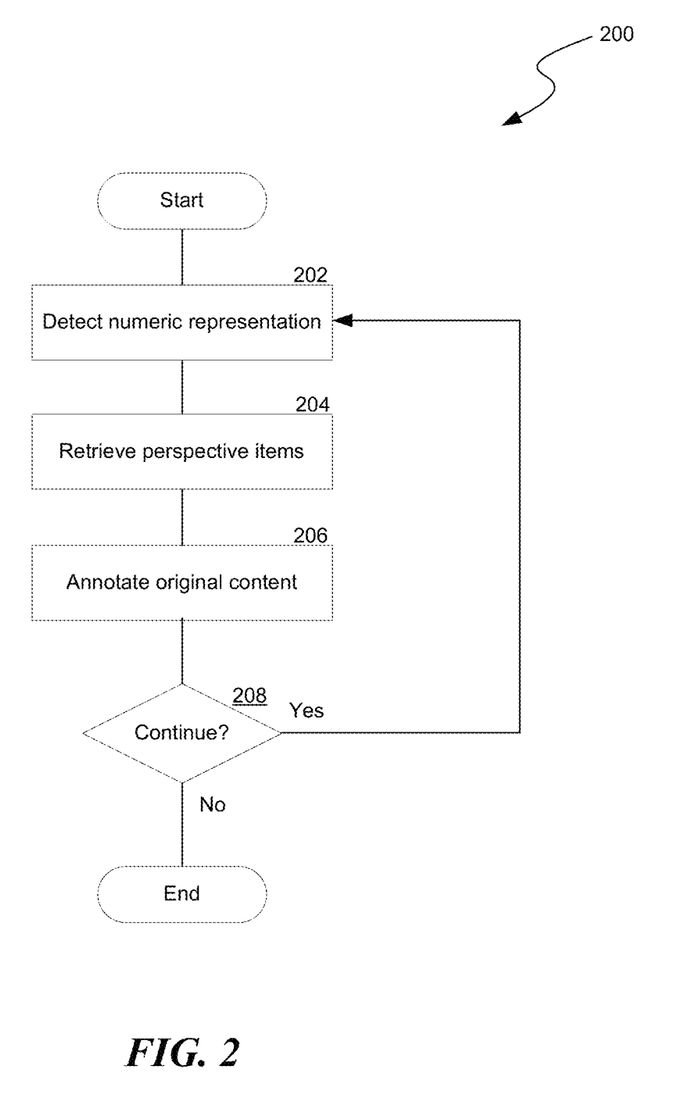
FIG. 2 is a flow diagram illustrating a process for perspective annotation in accordance with embodiments of the present technology.

FIG. 2 is a flow diagram illustrating a process 200 for perspective annotation in accordance with embodiments of the present technology. Embodiments of the process 200 may be performed by the computer framework 100 of FIG. 1 and/or other suitable computing devices. Embodiments of the process 200 may also be embodied on an article of manufacture, e.g., as processor-readable instructions stored on a computer readable storage medium or be performed as a computer-implemented process, or in other suitable ways. Even though the process 200 is described below with reference to the computer framework 100 of FIG. 1, in other embodiments, the process 200 may be implemented in a standalone computer or other suitable computer systems or devices.

As shown in FIG. 2, the process 200 includes detecting numeric representations of an original content at stage 202. In certain embodiments, the content can include a web page, email, and/or other suitable types of electronic content published by a content source. In one embodiment, detecting numeric representations can include transmitting the electronic content to a server having the computer framework 100 of FIG. 1, and detecting numerical representations using the detection component 104, as described with reference to FIG. 1. The server may be associated with or independent from the content source. In another embodiment, the computer framework 100 may reside on a client device. Upon receiving the electronic content from a client application of the client device, numerical representations may be detected using the detection component 104, as described with reference to FIG. 1. In yet another embodiment, a user of the electronic content may submit the electronic content to a server having the computer framework 100 of FIG. 1. Upon receiving the submission, the server may then detect the numerical representations using the detection component 104, as described with reference to FIG. 1.

The process 200 can then include retrieving perspective items based on the detected numerical representations and transmitting the retrieved perspective items in, for example, a machine readable format or other suitable formats, to the client device or client application at stage 204. For example, in one embodiment, the perspective items may be retrieved from the database 109 (FIG. 1) based on keywords associated with the detected numerical representations, as described in more detail above with reference to FIG. 1. In other embodiments, the perspective items may also be retrieved from other suitable sources. For example, the perspective items may be generated by crowdsourcing, machine learning, user input, and/or other suitable information gathering techniques.

The process 200 can then include annotating the original content at stage 206. The original content may be annotated with the retrieved perspective items as comments, footnotes, and/or other suitable content components. In one embodiment, the annotated content may be output to a user as a web page and/or other suitable read-only document. In another embodiment, annotating the original content can include embedding interactive components in the annotations. For example, the annotated content may be configured to receive user selections of the annotated perspective items, and insert the selected perspective items into the body of the original content in a word processing application, a web publishing application, and/or other suitable applications. In further examples, the annotated content may include polls and/or other suitable interactive components.

The process 200 then includes a decision stage 208 to determine if the process continues. In one embodiment, the process continues if additional content is present. In other embodiments, the process can continue based on other suitable criteria. If the process continues, the process 200 reverts to detecting numeric representation at stage 202; otherwise, the process ends.

Figure 3A:
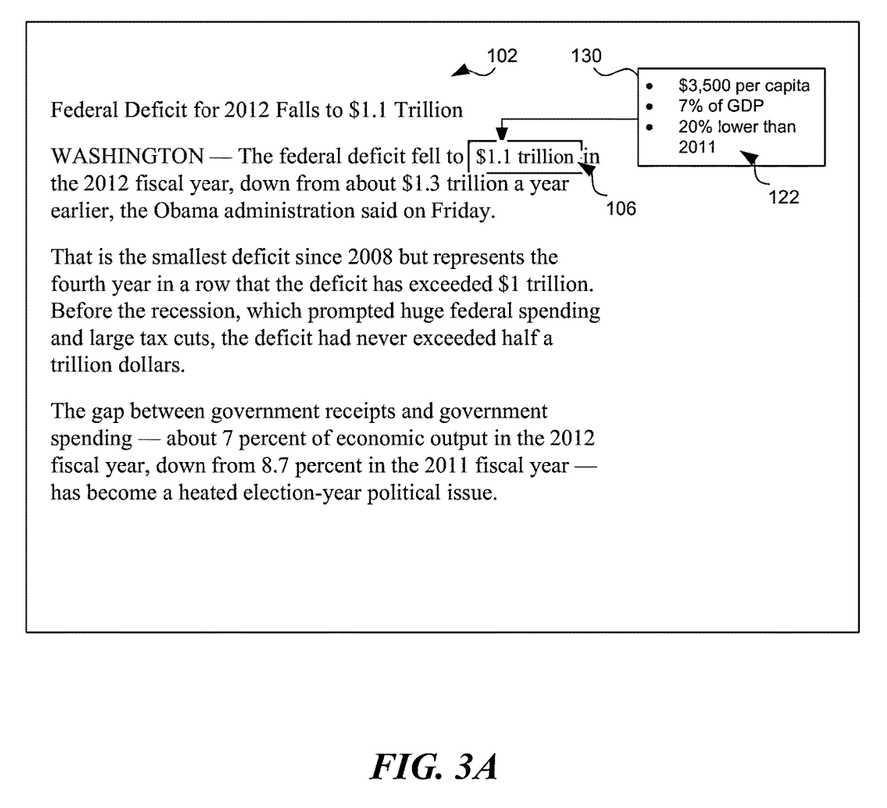
FIGS. 3A-3C are example renderings of annotated content with perspective annotation in accordance with embodiments of the present technology.
Figure 3B:
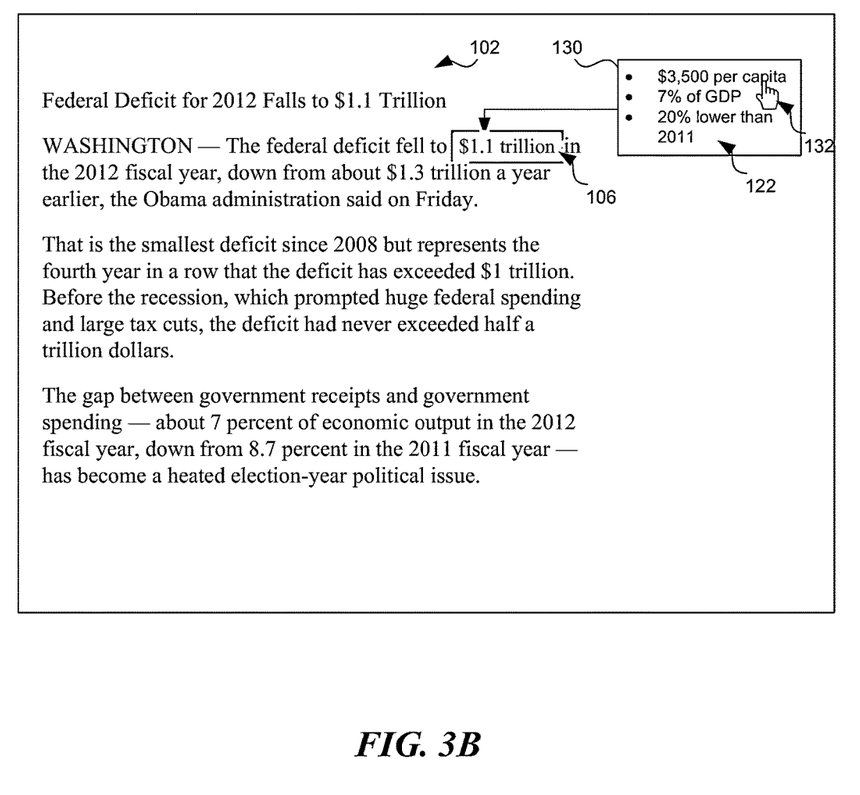
Figure 3C:
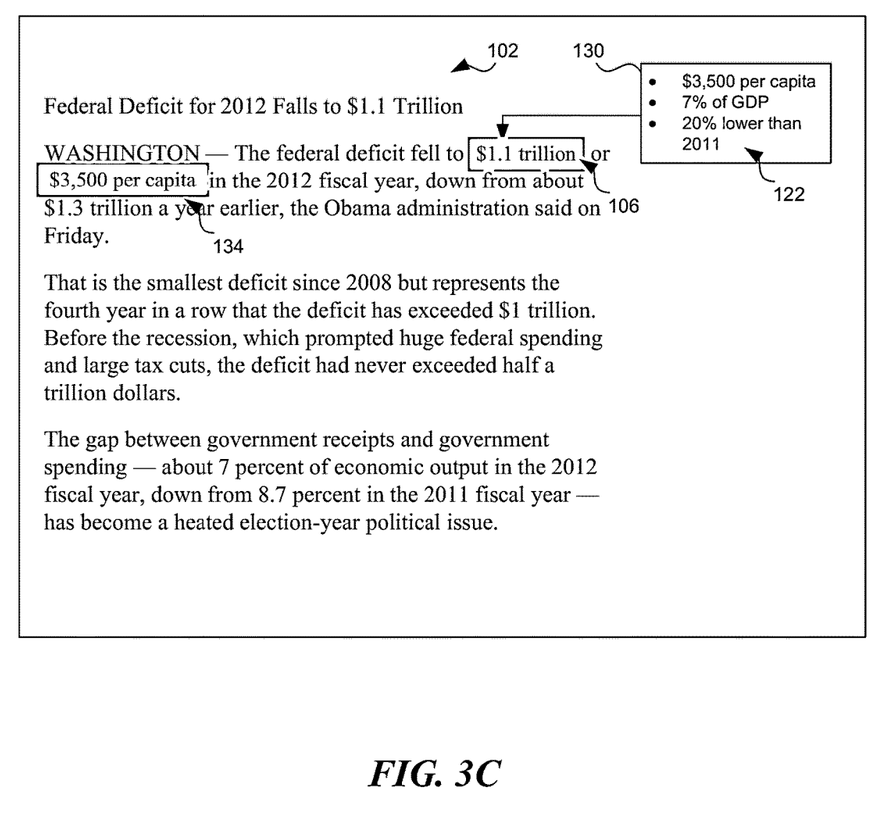

FIGS. 3A-3C are example rendering of annotated content with perspective annotation in accordance with embodiments of the present technology. As shown in FIG. 3A, the original content 102 includes a news story entitled "Federal Deficit for 2012 Falls to $1.1 Trillion." By processing the original content 102 in accordance with embodiments of the present technology, the numerical representation 106 (i.e., "1.1 Trillion") may be identified, and a plurality of perspective items 122 (i.e., $3,500 per capita, 7% of GDP, 20% lower than 2011") may be displayed in a window 130 as a comment adjacent the original content 102. As shown in FIG. 3B, the displayed perspective items 122 may also allow a user to select one of the perspective items 122 (i.e., "$3,500 per capita") with a single click, double click, or other suitable input mechanisms (as shown with cursor 132). In response, as shown in FIG. 3C, the selected perspective item 122 (i.e., "$3,500 per capita") may be inserted into the body of the original content 102 as new text 134.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method performed by a processor, the method comprising:
    detecting a subject and a numerical representation in an original content, the numerical representation including a number with an associated unit of measurement;
    associating the detected numerical representation with the subject based on a sentence structure of the original content, the detected numerical representation denoting a value associated with the subject;
    retrieving one or more perspectives from a database by searching the database using the detected subject and the associated numerical representation as one or more keywords, the one or more retrieved perspectives individually including a re-expression of information contained in the detected numerical representation regarding the subject; and outputting the original content with the generated one or more perspectives as an annotated content.

2. The method of claim 1 wherein detecting the numerical representation includes distinguishing at least one of an amount of money, a temperature, a pressure, a flow rate, an area, a length, a depth, a width, a speed, or a duration of time from at least one of an address, a telephone number, a date, or a serial number.

3. The method of claim 1 wherein:
detecting the subject and the numerical representation including distinguishing the numerical representation from non-numerical representations including an address, a telephone number, or a date.

4. The method of claim 1, further comprising:
analyzing the original content for the subject of the numerical representation; and
wherein generating the one or more perspectives includes retrieving one or more perspectives from a database using the subject as a keyword.

5. The method of claim 1 wherein generating the one or more perspectives includes generating the one or more perspectives via at least one of crowdsourcing, machine learning, or user input.

6. The method of claim 1 wherein retrieving the one or more perspectives includes retrieving a plurality of perspectives using the subject as a keyword and ranking the retrieved perspectives based on at least one of usage, popularity, or importance of the individual perspectives.

7. The method of claim 1 wherein associating the original content includes annotating the original content with the generated one or more perspectives as a comment or a footnote.

8. The method of claim 1, further comprising outputting the annotated content as a read-only web page.

9. The method of claim 1, further comprising:
retrieving a plurality of perspectives using the subject as a keyword, each of the retrieved perspectives including a different re-expression of information contained in the detected numerical representation regarding the subject than other retrieved perspectives;
displaying the retrieved plurality of perspectives to a user;
receiving user input to select one of the retrieved perspectives displayed to the user in the annotated content; and
inserting the selected one of the perspectives into the original content.

10. The method of claim 1, further comprising:
retrieving a plurality of perspectives using the subject as a keyword, each of the retrieved perspectives including a different re-expression of information contained in the detected numerical representation regarding the subject than other retrieved perspectives;
displaying the retrieved plurality of perspectives to a user;
receiving a user selection of one of the perspectives in the annotated content;
storing the user selection of one of the perspectives in a database; and
wherein retrieving the one or more perspectives includes ranking the one or more perspectives based on the stored user selection in the database.

11. A method performed by a processor coupled to a memory containing a database, the method comprising:
receiving an original content from a client device or a client application via a computer network;
detecting a subject phrase and an associated numerical representation in the received original content, the numerical representation including a number and a unit of measure, wherein the numerical representation denotes a value associated with the subject phrase;
retrieving one or more perspectives from the database by searching the database using the detected subject phrase and the associated numerical representation as one or more keywords, the one or more perspectives individually including a different restatement of information contained in the numerical representation regarding the subject phrase than other perspectives; and
transmitting, via the computer network, the retrieved one or more perspectives in a machine readable format to the client device or the client application for annotating the original content to form an annotated content.

12. The method of claim 11 wherein detecting the numerical representation includes detecting the numerical representation based on rule-based heuristics.

13. The method of claim 11 wherein detecting the numerical representation includes detecting the numerical representation based on rule-based heuristics to distinguish at least one of an amount of money, a temperature, a pressure, a flow rate, an area, a length, a depth, a width, a speed, or a duration of time from at least one of an address, a telephone number, a date, or a serial number.

14. The method of claim 11 wherein detecting the numerical representation includes detecting the numerical representation based on at least one or the following rules:
an addresses is not a numerical representation;
a telephone number is not a numerical representation;
a date value is not a numerical representation; or
a serial number is not a numerical representation.

15. The method of claim 11 wherein detecting the numerical representation includes detecting the numerical representation based on at least one or the following rules:
a numerical figure following a dollar sign is a numerical representation;
a numerical figure followed by a degree sign is a numerical representation;
a numerical figure followed by a unit of measurement is a numerical representation; or
a numerical figure with a decimal point is a numerical representation.

16. The method of claim 11 wherein the processor includes a detection component, and wherein the method further comprises training the detection component to distinguish between a numerical representation and a non-numerical representation via machine learning.

17. The method of claim 11 wherein detecting the numerical representation includes detecting the numerical representation via at least one of natural language processing, compound term processing, deep linguistic processing, or semantic indexing.

18. A computer system having a processor, a memory, and a display interconnected to one another, the memory containing instructions, when executed by the processor, causing the processor to perform a process comprising:
identifying a subject phrase and an associated numerical representation in an article, the numerical representation including a number and a unit of measure, wherein the numerical representation denotes a value associated with the identified subject phrase;
generating a perspective for the identified subject phrase with the associated numerical representations from a database by searching the database using the subject phrase and the associated numerical representation as one or more keywords, the perspective including a re-expression or restatement of information contained in the numerical representations regarding the subject phrase via unit conversion, data normalization, data rescaling, data conversion, or data comparison;

annotating the article with the generated one or more perspectives as comments or footnotes to form an annotated content; and outputting the annotated content having the original content and the generated one or more perspectives on the display.

19. The computer system of claim 18 wherein the process further includes:

receiving user input to select the perspective in the annotated content; and inserting the selected perspective into the original content.

20. The computer system of claim 18 wherein:

generating the perspective includes generating a plurality of perspectives;

outputting the annotated content includes outputting the annotated content having the original content and the generated perspectives on the display; and the process further includes:

receiving a user selection of one of the perspectives in the annotated content;

storing the user selection of one of the perspectives in a database; and wherein generating the perspectives includes ranking the perspectives based on the stored user selection in the database.

* * * * *